Sept. 1, 1970     P. G. LEIGH ET AL     3,526,144
SERVO TORQUE BALANCE DC RATE GYRO
Filed Nov. 9, 1966     5 Sheets-Sheet 1

INVENTORS
Philip G. Leigh
Edward G. Seavey
Flehr, Hohbach, Test,
Albritton & Herbert
Attorneys

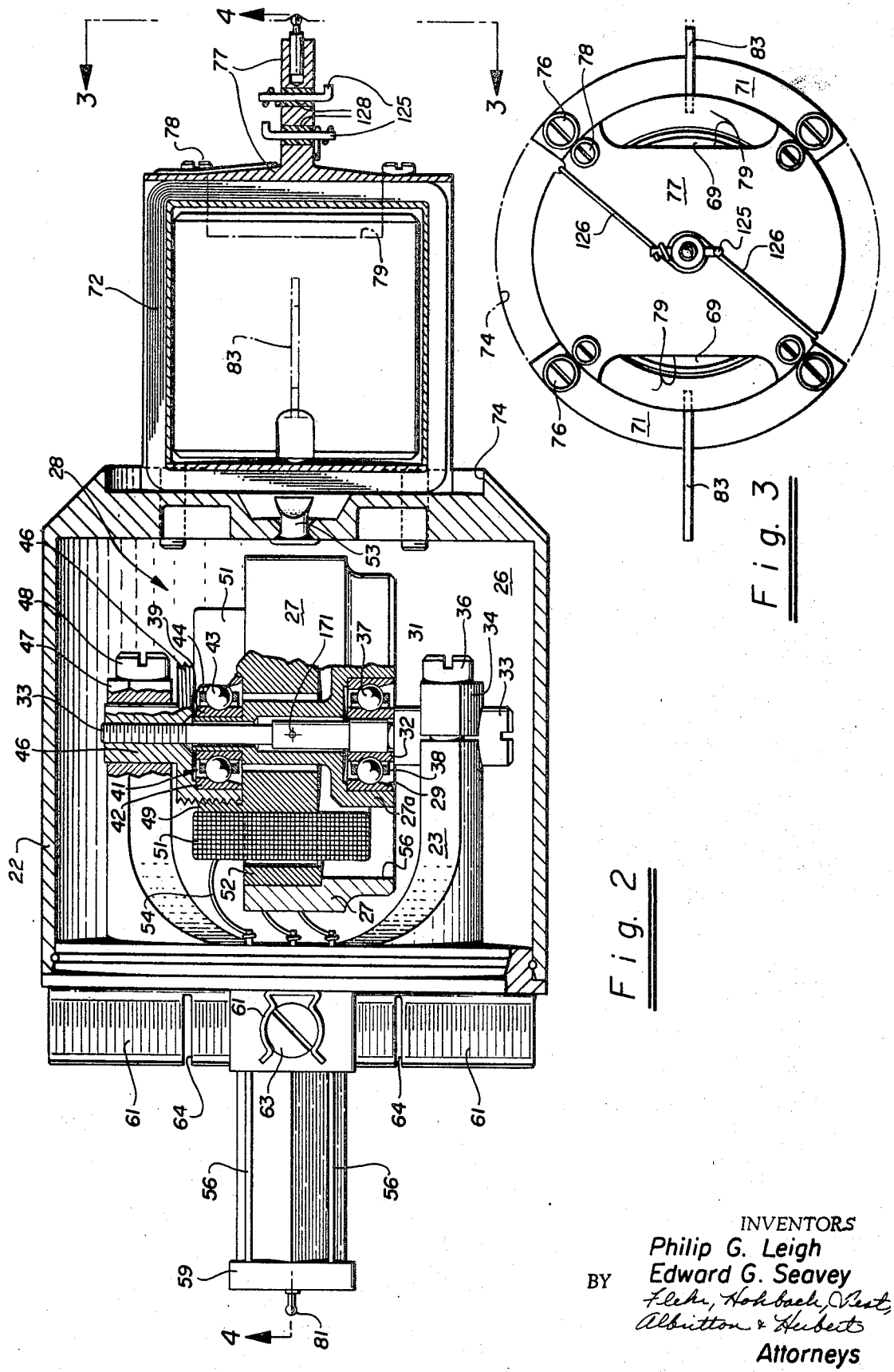

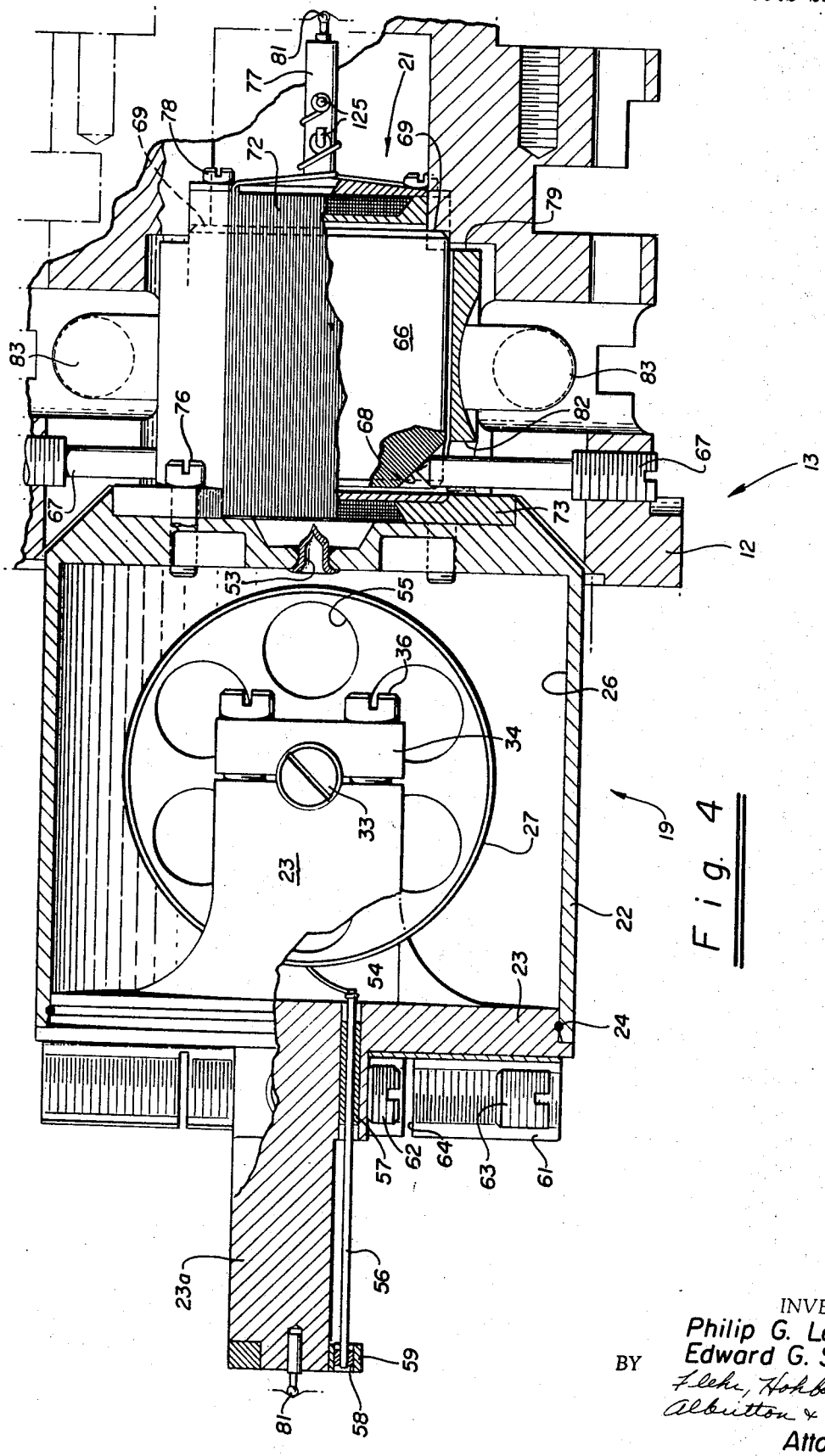

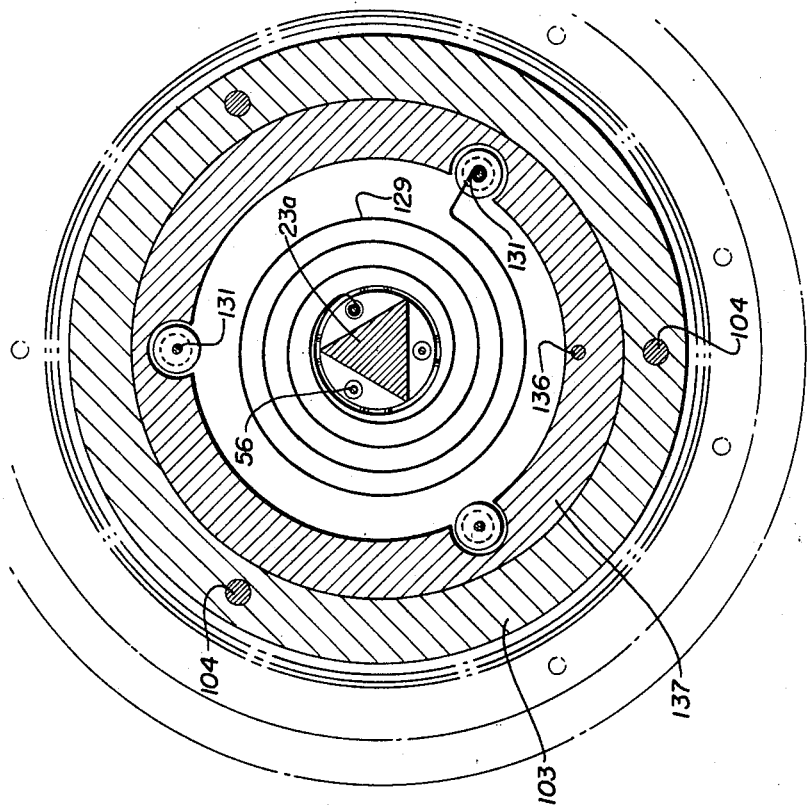
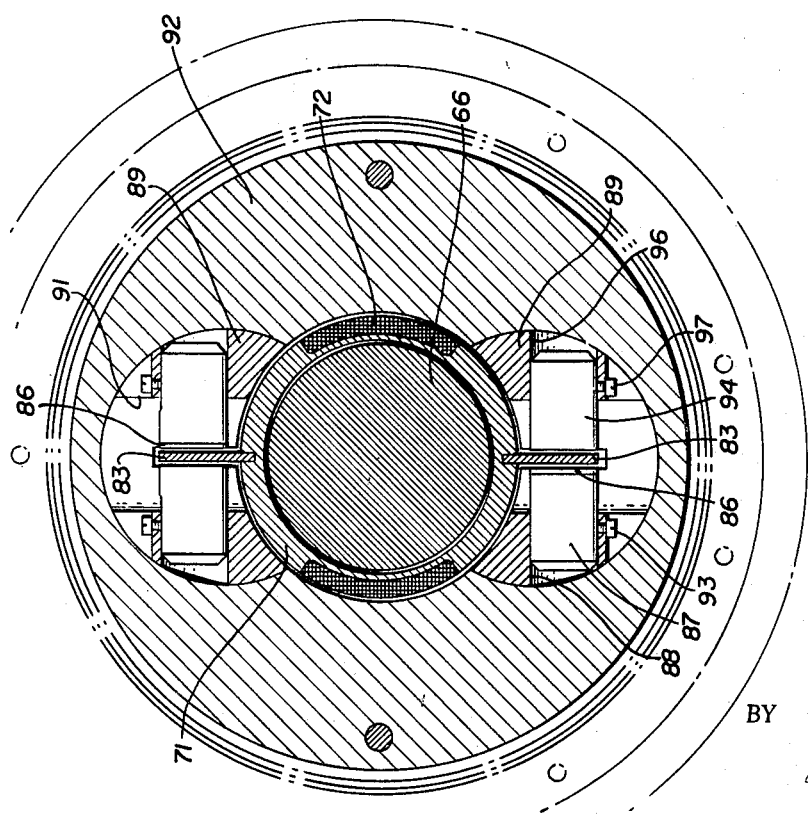

United States Patent Office 3,526,144
Patented Sept. 1, 1970

3,526,144
SERVO TORQUE BALANCE DC RATE GYRO
Philip G. Leigh, Oakland, and Edward G. Seavey, Concord, Calif., assignors to Systron-Donnor Corporation, Concord, Calif., a corporation of California
Filed Nov. 9, 1966, Ser. No. 593,140
Int. Cl. G01c 19/28
U.S. Cl. 74—5.5
10 Claims

ABSTRACT OF THE DISCLOSURE

Rate gyro with gimbaling means having paddle means and means for sensing the position of the paddle means for restraining movement of the gimbaling means to provide a servo torque balance.

---

This invention relates to a rate gyro and more particularly to a precision servo torque balance DC rate gyro.

Rate gyros have heretofore been available. However, such rate gyros have not been widely used because they have had relatively low natural frequencies, dynamic range and resolution as a consequence of having had a relatively low electrical restoring loop stiffness. There is, therefore, a need for a new and improved rate gyro.

In general, it is an object of the present invention to provide a rate gyro which has a relatively high natural frequency.

Another object of the invention is to provide a rate gyro of the above character which has increased dynamic range and increased resolution.

Another object of the invention is to provide a rate gyro of the above character which has reduced cross-coupling.

Another object of the invention is to provide a rate gyro of the above character which has increased linearity.

Another object of the invention is to provide a rate gyro of the above character which has improved means for balancing the same to minimize or eliminate G sensitivity of the rate gyro.

Another object of the invention is to provide a rate gyro of the above character which has a high level DC output.

Additional objects and features of the invention will appear from the following description in which the preferred embodiment is set forth in conjunction with the accompanying drawings.

Referring to the drawings:

FIG. 2 is an enlarged cross-sectional view of a portion of the rate gyro shown in FIG. 1.

FIG. 3 is an end elevational view looking along the line 3—3 of FIG. 2.

FIG. 4 is a cross-sectional view taken along the line 4—4 of FIG. 2.

FIG. 5 is a cross-sectional view taken along the line 5—5 of FIG. 1.

FIG. 6 is a cross-sectional view taken along the line 6—6 of FIG. 1.

In general, the rate gyro consists of a rotating mass and means for rotating the mass. It also has provision for gimbaling the rotating mass and the rotating means about an axis which is perpendicular to the axis of rotation of the mass and referred to as the output axis. Means is provided for floating the means for gimbaling, the rotating mass and the means for rotating the mass so that it is substantially neutrally buoyant. Paddle means is carried by the gimbaling means and pick-off means is provided for sensing the position of the paddle means and produces an electrical signal proportional to the spacing between the pick-off means and the paddle. Means is provided which is responsive to the electrical signal for opposing rotation of the gimbaling means about the output axis.

Figure 1:
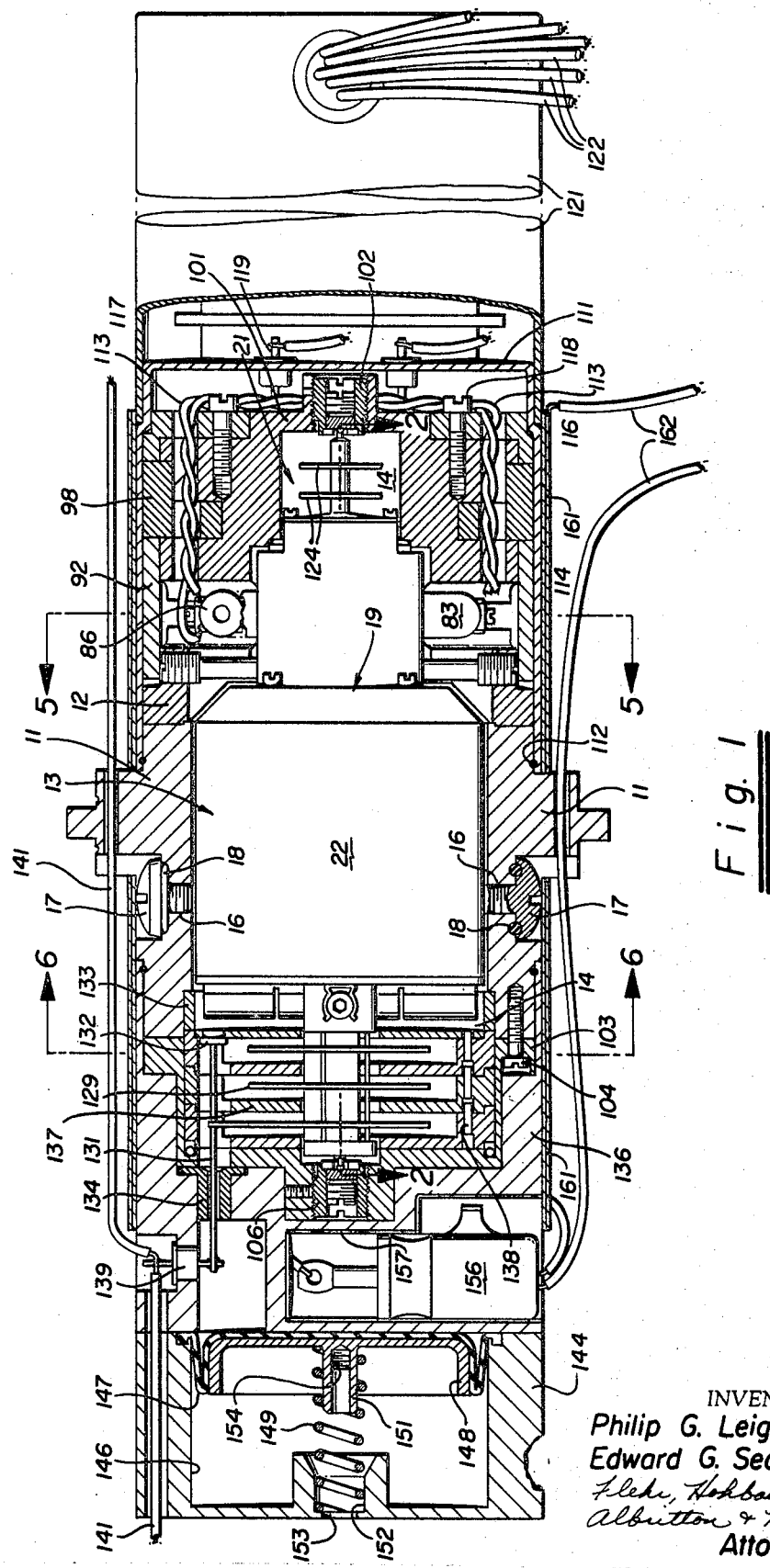
FIG. 1 is an enlarged side elevational view, a part of which is in cross-section, of a rate gyro incorporating the present invention.

As shown in FIG. 1, the servo balance DC rate gyro consists of a housing 11. A magnet mount 12 is secured to the housing by suitable means such as screws (not shown). A float assembly 13 is disposed within the housing 11 and within the magnet mount 12. Means is provided to make the float assembly neutrally buoyant when suspended in a damping fluid at the operating temperature and consists of a fluid which is disposed in the space 14 in the housing 11 and in the magnet mount 12. The housing 11 is filled with the fluid through holes 16 which are normally closed by filling screws 17. O-rings 18 are provided to form a good seal between the housing 11 and the filling screws 17.

The float assembly 13 consists of a float 19 and a torque motor assembly 21 which is secured to the float 19. The float 19 consists of a cylindrical float shell 22, of a suitable material such as magnesium, which has one end open. The open end of the float shell 22 is closed by a fork-like member 23 and a seal is formed between the float shell 22 and the fork-like member 23 by a glue ring 24. The float shell 22 and the fork-like member 23 provide an enclosed space 26 which is filled with suitable fluid such as helium.

A one-piece momentum wheel 27 and a spin motor 28 are disposed within the space 26 and are carried by the fork-like member 23. The wheel 27 serves as a rotating mass and the spin motor 28 serves as means for rotating the mass. The momentum wheel 27 is provided with a hub portion 27a. One portion of the hub portion 27a is carried by the outer race 29 of a ball bearing assembly 31. The inner race 32 of the ball bearing assembly 31 is mounted upon a stationary shaft 33 carried by the fork 23 and secured thereto by a mounting block 34 and screws 36. The ball bearing assembly 31 also includes a plurality of balls 37 carried by a retaining ring 38. The upper portion of the hub portion 27a is carried by the inner race 39 of a ball bearing assembly 41. The ball bearing assembly 41 also includes an outer race 42 and a plurality of balls 43 carried by a retaining ring 44. The outer race 42 is mounted in a hub 46 which is carried by the other end of the fork-like member 23 and is secured thereto by a block 47 and screws 48. The hub 46 is threaded onto the shaft 33 and is also threaded into the stator 49 of the spin motor 28. A stator winding 51 is mounted upon the stator 49. The momentum wheel 27 is mounted on a hysteresis ring 52 which is disposed between the momentum wheel and the stator 49 and serves as the armature of the spin motor. The momentum wheel 27 is formed of suitable high density material. It is provided with a plurality of holes 55 which serve as lightening holes and which also serve to keep the radius of gyration of the momentum wheel out as far as possible from the spin axis for the momentum wheel which is coincident with the shaft 33. The lightening holes also facilitate circulation of the helium which serves as a cooling medium for the spin motor. An evacuation tube 53 is mounted in the float shell 22 for evacuating the space 26 and for inserting the helium atmosphere into the space 26.

With the foregoing construction of the motor 28, it can be seen that the momentum wheel 27 rotates with the outer race 29 of the ball bearing assembly 31 and with the inner race of the ball bearing assembly 41. Means is provided for supplying power to the spin motor and consists of a plurality of leads 54 which are connected to the stator winding 51. The leads 54 are connected to small rods 56 which extend through sleeves 57 of insulating material provided in the fork-like member 23. The outer ends of the rods 56 are secured in smaller sleeves 58 of insulating material provided in an anchor ring 59 carried on the outer end of an extension 23a of the fork-like member 23. The extension 23a in cross section is in the form of an equilateral triangle.

Means is provided for balancing the float assembly 13 so that there is no unbalance in the gravitational field, or upon acceleration. This means consists of four separate clips 61 which are spaced 90° apart on the outer surface of the fork-like member 23. The clips 61 are generally in the form of fuse clips and are formed of a suitable spring material such as beryllium copper. Each of the clips 61 is provided with threads which may receive a threaded balance weight 62 and which always receive a threaded balance weight 63. The clips 61 are provided with slots 64 which serve to isolate the balance weights 63 from the balance weights 62. The weights 62 are selected in size to adjust the fore and aft balance along the output axis of the rate gyro so that the center of gravity and the center of flotation are coincident along the length of the output axis of the float. The weights 63 are threaded inwardly or outwardly to adjust the radial balance of the float about the output axis. Two of the weights 63 are in alignment with the input axis 171 of the gyro and serve to provide balance on this axis, whereas the other two weights 63 are in alignment with the spin rotational axis and provide balance on this axis. The spring clip mountings for the weights 62 and 63 serve to permit very accurate adjustment of the weights while at the same time retaining them in the adjusted position. This means also has an advantage in that it permits removing of or adding to the weights without disassembling the float while in the housing.

The torque motor assembly 21 consists of a magnet 66 which is disposed within the magnet mount 12 and is held in a fixed position by screws 67 threaded into the magnet mount and engaging inclined surfaces 68 provided on the inner end of the magnet 66 to urge the magnet 66 outwardly and to retain the same against shoulders 69 provided on the magnet mount 12.

The torque motor assembly 21 includes a moving system which consists of a cylindrical armature 71 that has an armature coil 72 wound thereon. The armature 71 is provided with a flange 73 which is mounted in a recess 74 provided in the float shell 22. The flange 73 is secured to the shell 22 by cap screws 76 so that the float 19 moves with the moving system which forms a part of the torque motor assembly 21. The flanged shaft is provided with cutouts 79. A flanged shaft 77 is secured to the armature 71 by screws 78. Ball pivots 81 are mounted in the end of the shaft 77 and in the end of the portion 23a and are in axial alignment with the output axis of the gyro.

The armature 71 is provided with clearance holes 82 which accommodate the screws 67 to permit rocking motion of the armature 71 relative to the screws 67. A pair of flat vanes or paddles 83 are mounted upon the armature 71 at points spaced 180° from each other. The paddles 83 are formed of a suitable conducting material such as aluminum. Pick-off means is provided for sensing the position of the paddles 83 and consists of pick-off coils 86 mounted adjacent to each of the paddles in a plane substantially parallel thereto upon cylindrical blocks 87 mounted in bores 88 formed in cylindrical members 89. The members 89 are disposed in bores 91 provided in a soft iron member 92 carried by the magnet mount 12. The member 92 serves as a return path for the magnetic lines of flux emanating from the magnet 66. The blocks 87 are held in the desired position within the bore 88 by screws 93. Back stop means to limit maximum angular rotation of the float is provided for the paddles 83 and consists of blocks 94 similar to the blocks 87 which are disposed on the opposite sides of the paddles and are carried in bores 96 in the members 89 and held in the desired adjusted position by screws 97. Means is provided for augmenting the flux path for the magnet 66 and consists of soft iron inserts 98 carried by the magnet mount.

Means is provided for mounting the float assembly 13 upon the housing 11 and the magnet mount 12 and consists of a bearing plate 101 secured to the magnet mount 12 and which carries a bearing assembly 102 of conventional type to receive the ball pivot 81 mounted on the shaft 77. The bearing assembly 102 is threaded into the bearing plate 101 and adjusts the axial position of the float assembly. An end bell 103 is secured to the housing by screws 104. A bearing assembly 106 similar to bearing assembly 102 is mounted in the end bell 103 and engages the ball pivot mounted on the fork-like member 23.

A cylindrical cover 111 is mounted over the torque motor assembly 21 and is secured to the housing 11 by a glue ring 112. The pick-off coils 86 are connected by wires 113 extending through holes 114 provided in the magnet mount 12 and through holes 116 provided in a filler block 117 secured to the magnet mount 12 by screws 118. The wires 113 are connected to feed-through terminals 119 mounted in the cover 11. The feed-through terminals 119 are connected to electronic circuitry, hereinafter described, which is mounted within a cover 121 mounted on the cover 111. The output of the electronics is supplied to wires 122 extending out of the cover 121.

Means is provided for supplying a current to the coil 72 carried by the armature 71 and consists of a pair of hair springs 124 which have one end mounted upon insulated terminals 125 mounted on the shaft 77 by insulation 128 and connected by wires 126 to the coil 72. The other ends of the hair springs 124 are connected to the electronic circuitry carried within the cover 121.

Means is provided for supplying power to the rods or wires 56 carried by the fork 23 and consists of three separate hair springs 129, one end of which is secured to one of the rods 56 and the other end of which is connected to a pin 131. One end of each of the pins 131 is mounted in an insulator 132 which is cemented to a base plate 133 that is secured to the housing 11. The other end of each of the pins 131 is mounted in an insulator 134 mounted upon an expansion chamber base block 136. The base block 136 encloses a plurality of spacer members 137 formed of a suitable insulating material and which are keyed to the base plate 133 by a plurality of pins 138. The insulating spacers 137 serve to prevent the hair springs 129 from coming into contact with each other and thereby prevent shorts. The pins 131 are connected to feed-throughs 139 mounted in the base block 136. The feed-throughs are connected to wires 141 which are connected to a suitable source of power such as 110 volts 2-phase 400 cycles. A cover block 144 is mounted upon the base block 136 by suitable means such as screws (not shown). The cover block 144 is formed with a cylindrical recess 146 and has a flexible diaphragm 147 disposed therein. A piston 148 is secured to the diaphragm 147 and moves therewith. Means is provided for yieldably urging the piston 148 and the diaphragm 147 in a direction so that the pressure is maintained on the fluid within the gyro and consists of a spring 149, one end of which is disposed over a stem 151 provided on the piston 148 and the other end of which is disposed in a recess 152 provided in the cover block 144. A hole 153 is provided in the block 144 to permit access to threads 154 provided in the stem 151 so that the position of the piston 148 can be adjusted as the gyro is filled with fluid.

A thermostat 156 is mounted in a recess 157 provided in the base block 136. Heating blankets 161 are mounted over the exterior of the base block 136 of the housing 11 and the magnet mount 12 which are supplied with power controlled by the thermostat 156 through wires 162.

The electronic circuitry which is disposed within the cover 121 of the gyro is very similar to that disclosed in U.S. Letters Patent 3,074,279 and includes oscillator 166 which receives the output from the pick-off coils 86. The output of the oscillator is supplied to a detector 167. The output of the detector is supplied to an amplifier 168. The output of the amplifier feeds through a load resistor 169, also identified as $R_L$, to the torque coil 72.

Figure 8:
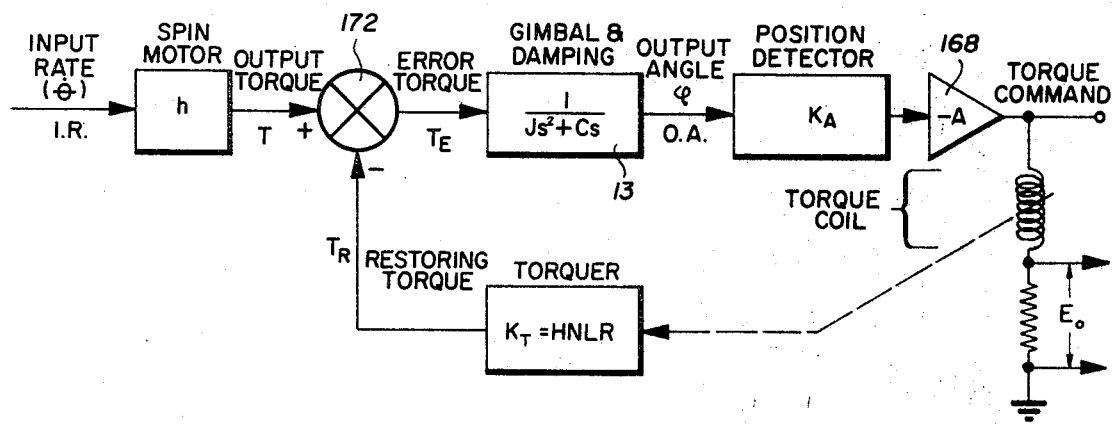
FIG. 8 is a diagram used for determining the system transfer function of the rate gyro.

Operation of the servo torque balance DC rate gyro may now be briefly described in conjunction with FIG. 8. When the gyro is in operation, the float shell 22 and the fork-like member 23 which are formed of magnesium serve as the gimbal or float assembly 13 for the gyro. Two phase power is supplied to the spin motor 28 through the hair springs 129 which are concentric with the output axis of the gyro. The motor turns at synchronous speed with the excitation frequency so that the axis repeatability of the gyro is a function of the stability of the frequency used for driving the motor. The hysteresis ring 52 causes the rotor to pick up a permanent magnetic field as the synchronous speed is approached and locks into the rotating magnetic field so that the motor is running in synchronism with the excitation voltage frequency or at some submultiple of it, depending upon whether it is a 2-pole or 4-pole motor.

As pointed out previously, the gimbal volume and mass distribution of the float assembly 13 is adjusted so that it is neutrally buoyant when suspended in the damping fluid used in the gyro at the operating temperature. The flotation in such a fluid gives excellent environmental immunity.

Now let it be assumed that an input is supplied to the gyro about the input axis. The input axis of the gyro is an axis 171 (see FIG. 2) which is at right angles or perpendicular to the axis of rotation of the momentum wheel 27. Also, let it be assumed that the input is in a counter-clockwise direction as viewed in FIG. 2. The axis of rotation for the momentum wheel 27 can be considered to be the spin reference axis, whereas the output axis for the accelerometer is perpendicular both to the input axis and to the spin reference axis and is coincident with the axis formed by the ball pivots 81.

A turn rate about the input axis of the gyro causes a slight rotation of the float assembly 13 about the output axis. This rotation of the float assembly 13 causes movement of the paddles toward or away from the pick-off coils 86. As explained in Pat. No. 3,074,279, this will spoil the Q of the tank circuit of the oscillator which affects the amplitude of the output of the oscillator. This change in amplitude is detected by the detector and amplified to produce a large output signal or voltage for small output axis rotation (e.g. 17.5 volts for one milli-radian rotation of the gimbal output axis). The output voltage causes current to flow through the load resistor 169 and the torque coil 72. The current flowing through the torque coil creates a counter torque which precisely restrains the gimbaled float. The output voltage $E_o$ generated across the resistor 169 is a DC voltage which is precisely and directly proportional to the input turn rate to the gyro.

Figure 7:
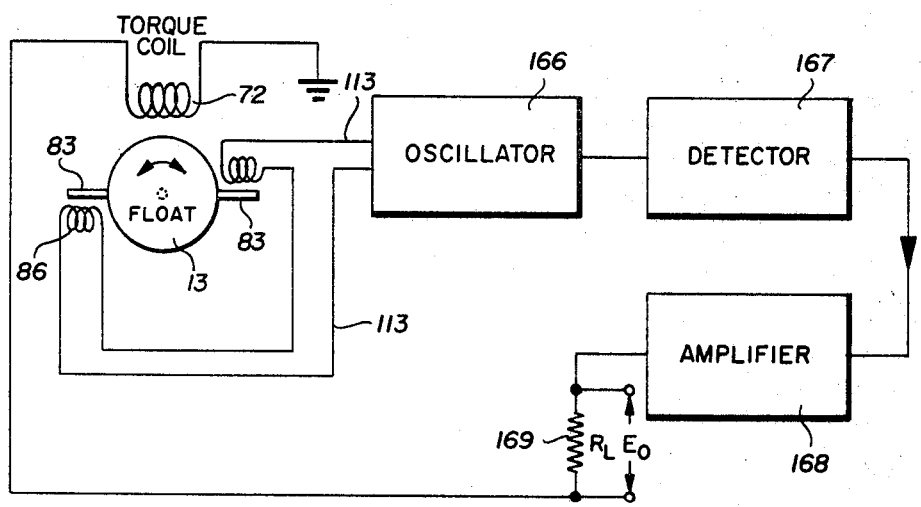
FIG. 7 is a block diagram of the rate gyro shown in FIG. 1.

As can be seen from FIG. 7, two pick-off coils 86 are utilized which are connected in series and form a part of the resonant circuit of the oscillator 166. By the use of two pick-off coils, it is possible to cancel out any lateral displacement of the float assembly 13 which could be due to shock or vibration and thus make the gyro only sensitive to angular movement of the float assembly.

Thus, simply stated, the rotation about the input axis which is mutually perpendicular to the spin axis and the output axis causes a torque to be produced by the angular momentum of the spinning gyro wheel 27. This torque tends to rotate the float assembly about the output axis. This tendency to rotate is sensed by the pick-off coils and is detected and fed back into the torque coil to restrain the movement of the float assembly to a very small angle of one milliradian maximum. This high degree of electrical restraint provides an output signal which precisely restrains the gimbaled float assembly. The output signal which is supplied through the resistor 169 to the torque coil 72 forms a very precise high level DC voltage measure of the restoring torque and, therefore, a measure which is proportional to the input rate. The torque output from the torque motor assembly 21 is inherently linear with current since the current to torque transduction depends only on the integrated magnetic field strength of the permanent magnet assembly acting on the torque coil and on geometric quantities such as the number of turns, length of conductor in the magnetic field, and radius of action of turns. The current flowing through the torque motor assembly 21 has a negligible reaction effect upon the magnetic torquing system due to the small angular rotation of the moving system.

By way of example, there is shown in FIG. 8 the actual operating parameters of a system utilized in the present servo torque balance DC rate gyro for a 100° per second range unit with the various transfer function parameters given in the figure. As can be seen from FIG. 8, the input rate $\dot{\theta}$ acts upon $h$, the angular momentum of the spin motor. The product of the input rate times the angular momentum results in a torque about the output axis. $h$ is $2\times10^3$ gm. cm.² per second. This torque acts upon the gimbaled float assembly 13 which is represented to be $1/JS^2+CS$ where J represents the angular momentum about the output axis of the float system and was shown to be equal to 22.5 gm. cm.². C represents the damping in dyne-cm. per radian per second and is $1.26\times10^4$. The error torque acting upon the float assembly 13 produces an output axis angle of rotation $\phi$. This angle of rotation $\phi$ is detected by the position detector represented by K and consisting of the coils 86, the oscillator 166 and the detector 167 whose output is amplified in the amplifier and fed back to the torque coil 72 of the torque motor. $K_A=1.75\times10^4$ volt/radian. The composite load admittance $g_L$ for the torque coil 72 and the load resistor 169 is $5\times10^{-4}$ mho where $R_L$ or resistor $169=1\times10^3$ ohm. The torque motor assembly 21 is represented by $K_T$ and represents the torque in dyne cm. produced per ampere of current through the coil 72 of the torque motor. This is $6.0\times10^5$ dyne-cm. per ampere which is a restoring torque in the opposite direction to the output axis torque and acts to cause rebalance. The positive torque shown is a result of the input rate. The negative torque shown at the summing junction 172 is a restoring torque. The algebraic sum of the output torque from the spin motor and the restoring torque causes an error torque to be generated which is utilized for maintaining servo balance.

The closed loop transfer function for a 100° per second unit can be written as follows:

$$\frac{E_0}{I.R.} = \frac{hK_AR_Lg_L}{JS^2+CS+K_Ag_LK_T}$$

$$= \frac{1.75\times10^7}{22.5S^2+1.26\times10^4S+5.25\times10^6} \text{ volts/rad./sec.}$$

DC output=5.81 volts/100°/sec.
$fn=77$ c.p.s.
$3=0.6$

Of the above terms not previously defined, $g_L$ is the inverse of the total torque coil resistance and the load resistor and is measured in mhos. $R_L$ is the ohmic value of the load resistor across which the output voltage is measured and generated. $K_T$ is the torquer constant which is the amount of torque per ampere of current through the torque motor measured in dyne centimeters per ampere.

The servo torque balance DC rate gyro described above has a number of very distinctive advantageous features. It, in particular, has a very high electrical loop stiffness which makes it possible to achieve a higher natural frequency. Additional benefits which accrue from such improvements are a smaller amount of output axis rotation with resultingly smaller cross-coupling effect which is normally due to output axis rotation causing a change in the input axis direction. Further, since a high torquing constant is obtained, that is, a high torque is produced which is used for restoring the output axis to null per unit of error signal detected, it is possible to utilize a gyro with a very wide range of input rates. Thus, by way of example, the gyro can be utilized with maximum input rates from zero to 200° per second. For a 10° per second maximum input rate unit, the unit would have a 33 cycle natural frequency. For a 100° per second unit, the gyro would have approximately a 77 cycle per second natural frequency. For 200°/sec., the unit would have an 89 cycle per second natural frequency. Thus, there has been provided a very great improvement over gyros heretofore available. It also has been found that the dynamic range, the composite error, the natural frequency, resolution, cross-coupling and the linearity have all been improved to a very substantial extent. The highly efficient torque motor assembly 21 permits the gyro to operate over its full dynamic range with extremely small higher order errors.

Due to the small mechanical restraint of the output axis by hairsprings 124 and 129, as compared to the electrical restraint of the torque coil, a higher electrical output signal for any desired rate range is possible than for previously existing rate gyroscopes. As a consequence of the present design which is virtually free of mechanical constraint on the gimbal axis and since the electrical constraints are inherently free of hysteresis, nonlinearities and null torque, this unit represents a significant improvement over previous designs in hysteresis, linearity and dynamic range (least detectable input relative to maximum input).

It is apparent from the foregoing that there has been provided a new and improved servo torque balance DC rate gyro that has greatly improved characteristics. In addition, it is relatively small and light in weight.

We claim:

1. In a servo torque balance DC rate gyro having an input axis and an output axis, a rotating mass having a spin axis substantially perpendicular to the input axis and the output axis, means for rotating the mass, means for gimbaling the rotating mass and the means for rotating the mass, the gimbaling means having an axis which is perpendicular to the axis of rotation of the mass and coincident with the output axis, means for floating the gimbaling means, the rotating mass and the means for rotating the mass so that they are substantially neutrally buoyant, paddle means carried by the gimbaling means and movable with the gimbaling means, and means for sensing the position of the paddle means to produce a DC signal, and means responsive to said DC signal for restraining movement of said gimbaling means about said output axis.

2. A gyro as in claim 1 wherein said means responsive to said DC signal for restraining movement of said gimbaling means about said output axis includes a permanent magnet forming a magnetic field, a torque coil disposed in the magnetic field and secured to the gimbaling means, and means for supplying said DC signal to said torque coil.

3. A gyro as in claim 1 wherein said means for gimbaling the rotating mass and the means for rotating the mass includes means carried by the gimbaling means for providing fore and aft balance of the gimbaling means on the output axis and balancing means carried by the gimbaling means for radially balancing the gimbaling means about the output axis.

4. In a servo torque balance DC rate gyro having an input axis and an output axis, a housing, a rotating mass having a spin axis substantially perpendicular to the input axis and the output axis, a spin motor for rotating the mass, gimbaling means mounting said mass and said spin motor to gimbal the same for rotation about an axis which is perpendicular to the axis of rotation of the mass and substantially coincident with the output axis, means disposed within the housing for floating the gimbaling means so that the rotating mass, the spin motor and the gimbaling means are substantially neutrally buoyant, paddle means mounted on the gimbaling means and movable with the gimbaling means, means including a pick-off coil for sensing the position of the paddle means and producing a DC signal in accordance with the position of the paddle means relative to the pick-off coil, a permanent magnet mounted in the housing in a fixed position in the housing, said magnet producing a magnetic field within the housing, a torque coil disposed in the magnetic field of the permanent magnet and secured to the gimbaling means, and means connecting the DC signal to the torque coil to cause the torque coil to produce a torque for restraining movement of said gimbaling means about the output axis.

5. In a servo torque balance DC rate gyro having an input axis and an output axis, a rotating mass having a spin axis substantially perpendicular to the input axis and to the output axis, means for rotating the mass, means for gimbaling the rotating mass and the means for rotating the mass, the gimbaling means having an axis which is perpendicular to the axis of rotation of the mass and coincident with the output axis, means for floating the gimbaling means, the rotating mass and the means for rotating the means so that they are substantially neutrally buoyant, paddle means carried by the gimbaling means and movable with the gimbaling means, means for sensing the position of the paddling means to produce a DC signal, means responsive to said DC signal for restraining movement of the said gimbaling means about said output axis, said paddle means comprising a pair of paddles mounted on the gimbaling means and disposed 180° apart and wherein said means for sensing the position of the said paddle means includes a pick-off coil disposed adjacent to each of said paddles, said pick-off coils being serially connected so that lateral movements of the gimbaling means are balanced out.

6. In a servo torque balance DC rate gyro having an input axis and an output axis, a housing, a rotating mass having a spin axis substantially perpendicular to the input axis and the output axis, a spin motor for rotating the mass, gimbaling means mounting said mass and said spin motor to gimbal the same for rotation about an axis which is perpendicular to the axis of rotation of the mass and substantially coincident with the output axis, means disposed within the housing for floating the gimbaling means so that the rotating mass, the spin motor and the gimbaling means are substantially neutrally buoyant, paddle means mounted on the gimbaling means and movable with the gimbaling means, means including a pick-off coil for sensing the position of the paddle means and producing a DC signal in accordance with the position of the paddle means relative to the pick-off coil, a permanent magnet mounted in the housing in a fixed position in the housing, said magnet producing a magnetic field within the housing, a torque coil disposed in the magnetic field of the permanent magnet and secured to the gimbaling means, and means connecting the DC signal to the torque coil to cause the torque coil to produce a torque for restraining movement of said gimbaling means about the output axis, said means for mounting said magnet including a magnet mount secured to said housing, said magnet mount being formed with shoulders, said magnet having inclined surfaces, and pin means carried by the magnet mount and having cooperating inclined surfaces engaging the inclined surfaces of the magnet for retaining the magnet in engagement with said shoulders to hold said magnet in a predetermined position in said magnet mount.

7. A gyro as in claim 6 together with an armature disposed about said permanent magnet within said magnet mount, means for rotatably mounting said armature to permit movement of the same about the magnet, said torque coil being carried by said armature and wherein said armature has openings therein through which said pin means extend and which prevent movement of said armature relative to said pin means.

8. In a servo torque balance DC rate gyro having an input axis and an output axis, a housing, a rotating mass having a spin axis substantially perpendicular to the input axis and the output axis, a spin motor for rotating the mass, gimbaling means mounting said mass and said spin motor to gimbal the same for rotation about an axis which is perpendicular to the axis of rotation of the mass and substantially coincident with the output axis, means disposed within the housing for floating the gimbaling means so that the rotating mass, the spin motor and the gimbaling means are substantially neutrally bouyant, paddle means mounted on the gimbaling means and movable with the gimbaling means, means including a pick-off coil for sensing the position of the paddle means producing a DC signal in accordance with the position of the paddle means relative to the pick-off coil, a permanent magnet mounted in the housing in a fixed position in the housing, said magnet producing a magnetic field within the housing, a torque coil disposed in the magnetic field of the permanent magnet and secured to the gimbaling means, means connecting the DC signal to the torque coil to cause the torque coil to produce a torque for restraining movement of the said gimbaling means about the output axis, balance weight means mounted on said gimbaling means for balancing on the output axis said gimbaling means, said rotating mass, said spin motor, said armature, said torque coil mounted on said armature and said means for mounting said torque coil for rotational movement, and additional balance weight means mounted on said gimbaling means for providing balance on the input axis and the spin axis.

9. A gyro as in claim 8 wherein said first named and additional balance weight means include a plurality of threaded clips mounted on said gimbaling means, and threaded weights threaded into said clips, each of said clips being provided with a slot for isolating the weights carried therein from each other.

10. In a servo torque balance DC rate gyro having an input axis and an output axis, a housing, a rotating mass in the form of a momentum wheel having a spin axis substantially perpendicular to the input axis and the output axis, a spin motor for rotating the momentum wheel, gimbaling means including a fork-like member mounting said momentum wheel and said spin motor to gimbal the same for rotation about an axis which is perpendicular to the axis of rotation of the momentum wheel and substantially coincident with the output axis, a stationary shaft mounted on said fork-like member, said momentum wheel being rotatably mounted on said stationary shaft, said spin motor also being mounted on said stationary shaft and serving to rotate said momentum wheel, means disposed within the housing for floating the gimbaling means so that the rotating mass, the spin motor and the gimbaling means are substantially neutrally buoyant, paddle means mounted on the gimbaling means and movable with the gimbaling means, means including a pick-off coil for sensing the position of the paddle means and producing a DC signal in accordance with the position of the paddle means relative to the pick-off coil, a permanent magnet mounted in the housing in a fixed position in the housing, said magnet producing a magnetic field within the housing, a torque coil disposed in the magnetic field above the permanent magnet and secured to the gimbaling means, and means connecting the DC signal to the torque coil to cause the torque coil to produce a torque for restraining movement of said gimbaling means about the output axis.

References Cited

UNITED STATES PATENTS

| 2,929,250 | 3/1960 | Passarelli et al. | 74—5.6 |
| 2,955,472 | 10/1960 | Krupick et al. | 74—5.5 |
| 3,142,991 | 8/1964 | Pittman | 74—5.6 XR |
| 3,225,607 | 12/1965 | Schaberg et al. | 74—5.6 XR |
| 3,362,232 | 1/1968 | Swanson et al. | 74—5.6 |
| 3,359,806 | 12/1967 | Pittman | 74—5.6 |

FRED C. MATTERN, Jr., Primary Examiner

M. A. ANTONAKAS, Assistant Examiner

U.S. Cl. X.R.

74—5.6